Sept. 8, 1936. E. W. ISOM Re. 20,098
ART OF CRACKING HYDROCARBON OILS
Original Filed May 21, 1927
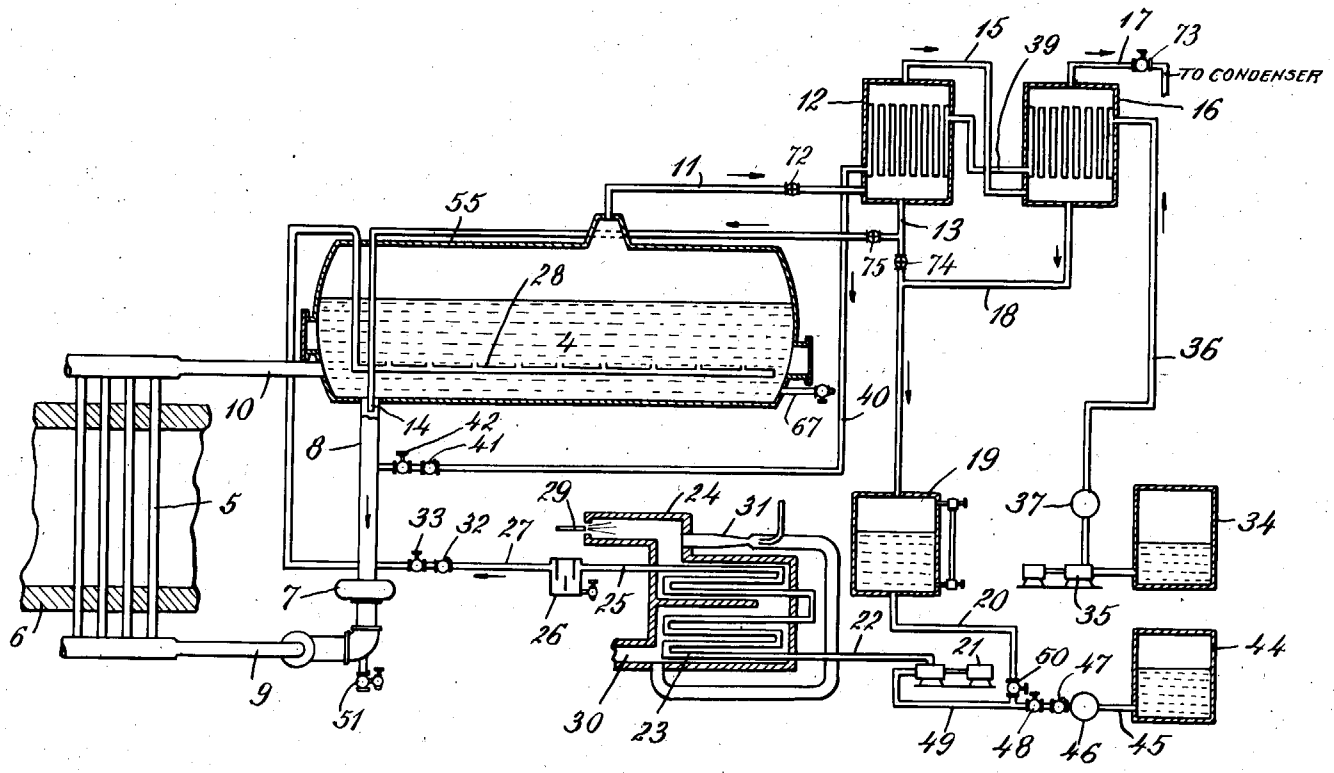
INVENTOR
Edward W. Isom
BY
Rector, Hibben, Davis & Macauley
ATTORNEYS Reissued Sept. 8, 1936

Re. 20,098

UNITED STATES PATENT OFFICE 20,098

ART OF CRACKING HYDROCARBON OILS

Edward W. Isom, Scarsdale, N. Y., assignor to Sinclair Refining Company, New York, N. Y., a corporation of Maine Original No. 1,708,180, dated April 9, 1929, Serial No. 193,193, May 21, 1927. Application for reissue June 30, 1931, Serial No. 548,013

6 Claims. (Cl. 196—48)

This invention relates to improvements in the cracking of heavier and higher boiling hydrocarbon oils, such as kerosene, gas oil, fuel oil or residues, to produce lighter and lower boiling hydrocarbon oils such as gasoline or gasoline-containing cracked distillates, therefrom. This application is in part a continuation of my prior application filed August 28, 1922, Serial No. 584,711.

In carrying out the present invention, a body of oil to be cracked is maintained at a cracking temperature by circulating oil from this body through heating tubes and back to the body and heating the oil to a cracking temperature in the heating tubes, vapors are taken off from this body of oil and subjected to a refluxing operation, reflux condensate from this refluxing operation is forced once through a separate heating conduit in which it is heated to a cracking temperature, and the hot oil products from this heating conduit are discharged into the body of oil first mentioned. Before the vapors are subjected to the refluxing operation from which reflux condensate is returned to this separate heating conduit, they may be subjected to another refluxing operation from which reflux condensate is returned directly to the body of oil, heavier reflux condensate thus being returned to the body of oil and lighter reflux condensate supplied to the separate heating conduit. The oil forced through the separate heating conduit is advantageously heated to a higher cracking temperature therein than is the oil body first mentioned. Relatively refractory stocks, such as reflux condensate or lighter reflux condensate, may thus be subjected to more severe cracking conditions in the heating conduit. Fresh oil may be supplied to the body of oil first mentioned during the operation, and additional fresh oil may be forced through the separate heating conduit together with the reflux condensate supplied thereto. In the treatment of different charging stocks some of which are relatively more refractory than others, in carrying out the present invention, relatively less refractory stock is supplied directly to the body of oil first mentioned and relatively more refractory stock is supplied to the separate heating conduit. The operation may be carried out in a continuous manner by continuously discharging tar or pitch-laden oil from the body of oil first mentioned.

In one way of carrying out the invention, the cracking operation carried out in the separate heating conduit is a vapor phase cracking operation. In the separate heating conduit, in this method of operation, the oil is vaporized substantially completely and the vapors are heated to a high cracking temperature. The body of oil first mentioned is maintained at a lower cracking temperature so that the temperature of the hot oil products from the vapor phase cracking operation is reduced as they are discharged into the body of oil. Undesirable reactions are thus arrested and objectionable overcracking usually incident to vapor phase operation may thus be avoided. The oil supplied to the separate heating conduit may thus be heated in vapor phase to a high cracking temperature for a relatively short time, the desired cracking effected and the cracked products then discharged into a body of oil where they are further subjected to the cracking conditions maintained therein but which cracking conditions are relatively mild.

The invention will be further described in connection with the accompanying drawing which illustrates, in a diagrammatic and conventional manner, in elevation and partly in section, an apparatus adapted for the practice of the process of the invention, but it is intended and will be understood that this further description and illustration are for the purpose of exemplification and that the invention is not limited thereto.

Referring to the drawing, a body of oil 4 is maintained in the shell or drum 55. This oil is circulated in a closed circuit from the shell or drum 55 through the battery of heating tubes 5 and back to the shell or drum by means of the circulating connections 8, 9 and 10 which include the circulating pump 7. The shell or drum 55, for example, may be maintained about two-thirds full of oil and circulation of this body of oil maintained through connections 8 and 9 to the heating tubes, upwardly through the heating tubes and back to the shell or drum through connection 10. The heating tubes 5 are arranged in a suitable furnace 6. To reduce vaporization of this body of oil, particularly of heavier components thereof, the shell or drum 55 is maintained under superatmospheric pressure. Vapors are taken off from the shell or drum through connection 11, passed through reflux condenser 12, vapors remaining uncondensed therein passed to reflux condenser 16 through connection 15, and vapors remaining uncondensed in reflux condenser 16 passed to a condenser (not shown) in which the cracked product is condensed through connection 17. The final condenser may be of any ordinary construction, and is connected to a receiver of ordinary construction adapted to provide for separation of uncondensed vapors and gases from the condensed product. The pressure on the vapors may be reduced and regulated by a valve 72 in connection 11 or by valve 73 in connection 17 or by suitable valves arranged beyond the condenser or receiver. Superatmospheric pressure may thus be maintained in the shell or drum 55 and the reflux condensers 12 and 16 may thus be operated at the same superatmospheric pressure or substantially at atmospheric pressure or at an intermediate pressure. Similarly, the pressure in the system may be maintained through the final condenser, or the final condenser may be operated substantially at atmospheric pressure or at an intermediate pressure.

The cooling and the refluxing of the vapors passing through the reflux condensers 12 and 16 may be promoted or effected by passing fresh oil to be supplied to the operation in indirect heat exchanging relation therewith, for example, or this cooling and refluxing may be effected by some extraneous cooling medium. In one advantageous method of operation, fresh oil, particularly less refractory fresh oil, supplied from tank 34 through connection 36 including meter 37 by means of pump 35 is passed first in indirect heat exchanging relation with the vapors in the second refluxing operation, then, through connection 39, in indirect heat exchanging relation with the vapors in the first refluxing operation, and then, through connection 40, introduced into the circulating body of oil. A check valve 41 is provided to prevent reverse flow through connection 40 and a valve 42 is provided for controlling the operation. Reflux condensate from the first refluxing operation, that carried out in reflux condenser 12, is discharged through connection 13, and in one advantageous method of operation is returned to the circulating body of oil through connection 14. This connection is advantageously arranged as illustrated to provide for circulation of the returned reflux condensate again through the heating tubes 5 before it is again permitted to escape from the shell or drum 55 as vapors. Part of the reflux condensate from reflux condenser 12 may be discharged to the tank 19. Valves 74 and 75 are provided for directing the flow of this reflux condensate and for controlling the operation in this respect. Reflux condensate from the second refluxing operation, that carried out in reflux condenser 16, is discharged to the tank 19 through connection 18. The lighter reflux condensate collecting in tank 19 if returned to the circulating body of oil 4, tends to vaporize therefrom without substantial cracking thus utilizing heat for vaporization of these components which in the present invention is made available, at least in large part, for useful cracking of the oil. At the same time, the present invention provides an advantageous method for further treatment and cracking of this more refractory reflux condensate.

This reflux condensate is forced from the tank 19, through connections 20, 49 and 22, by means of pump 21, once through the heating conduit 23. This separate heating conduit is arranged in a furnace 24 in which hot products of combustion from the burner 29 pass over the heating tubes making up the heating conduit, the waste heating gases escaping through stack flue 30. To assist in maintaining uniform furnace conditions, a part of the heating gases may be recirculated from near the stack flue and admixed with the fresh hot products of combustion passing over the heating conduit. A return flue for this purpose is shown at 31. This return flue may be provided with a steam injector, as illustrated, or with other suitable forcing means for effecting recirculation of part of the heating gases. The hot oil products from the heating conduit 23 pass through connections 25 and 27 to the perforated pipe 28 through which they are discharged into the body of oil maintained in the shell or drum 55. Where the cracking operation in the heating conduit 23 is carried out in the vapor phase, a tar separator 26 is with advantage included in the discharge connections. A check valve 32 to prevent reverse flow and a valve 33 for regulating and controlling the operation are also provided in the discharge connections from the heating conduit. A superatmospheric pressure in excess of that prevailing in the shell or drum 55 may be maintained in the heating conduit 23 by means of the valve 33, or the pressure at the discharge end of the separate heating conduit may be maintained at a value just sufficient to force the hot oil products therefrom into the body of oil in the shell or drum 55. In addition to the reflux condensate from tank 19, additional fresh oil, particularly more refractory fresh oil, may be forced through the heating conduit 23 in admixture with the reflux condensate by means of pump 21. This additional fresh oil may be supplied from tank 44 through connection 45 including meter 46 and check valve 47 to prevent reverse flow. Valves 48 and 50 are provided for controlling the supply of reflux condensate and such additional fresh oil to the pump 21. In place of such a single pump, separate pumps may be employed for supplying fresh oil and reflux condensate from tank 44 and tank 19 to the heating conduit 23.

A connection for discharging tar, or pitch-laden oil, from the shell or drum 55 is shown at 67. The operation in the shell or drum 55 can be carried out in a continuous manner by continuously discharging tar through connection 67. At the end of an operation, the charge of oil therein may be reduced to a heavy flux or residue and this flux or residue pumped out when the operation is discontinued. Connection 51 is provided for pumping out this part of the still system at the end of an operation.

In carrying out the present invention, stocks of different character are subjected to cracking conditions of special advantage with reference to the particular stock treated. Relatively more severe cracking conditions are maintained in the heating conduit 23 than in the circulating body of oil 4. In one way of carrying out the invention, the oil forced through the heating conduit 23 is heated to a high cracking temperature in the vapor phase therein. More refractory stocks are advantageously subjected to more severe cracking conditions in the heating conduit 23 while less refractory stocks are advantageously subjected to less severe cracking conditions in the shell or drum 55. The body of oil 4 is heated in a particularly advantageous manner by circulation through the heating tubes 5, and with this heating by maintaining a relatively high pressure on the drum or shell 55 stocks which are less refractory but which nevertheless are with advantage subjected to relatively high cracking temperatures may be subjected to particularly appropriate treatment in this part of the operation. Likewise, this invention provides for the advantageous separation of heavy and intermediate components refluxed from the vapors taken off from the combined operation and for the return of these separate reflux condensates to that part of the operation in which they are subjected to the most appropriate treatment. Less refractory products of the combined operation may be returned directly to the circulating body of oil 4 while more refractory intermediate components produced by the combined cracking operation or vaporized from the fresh oil are supplied to the heating conduit 23 where they are subjected to relatively more severe cracking conditions.

For the production of gasoline or motor fuel components, to illustrate, the temperature of the oil body 4 may be maintained in the neighborhood of 750° to 800° F. and the temperature of the hot oil products as they are discharged from the heating conduit 23 may be maintained in the neighborhood of 1000° to 1200° F. Gas oil, or heavy gas oil, or fuel oil, may be supplied directly to the body of oil 4. Light gas oil or kerosene or the bottoms from the redistillation of cracked distillates for the separation of gasoline components may be supplied to the heating conduit 23 together with the reflux condensate supplied thereto. The reflux condensate from the first refluxing operation may be returned directly to the body of oil 4 where it is of a less refractory character or this reflux condensate may be supplied to the heating conduit 23 where it is of a more refractory character. The heating of the tubes 5 is regulated to avoid excessive formation of pitch or carbon. The concentration of pitch in the body of oil 4 may also be regulated by discharging pitch-laden oil therefrom and regulating the rate at which oil is supplied thereto and at which such pitch-laden oil is discharged. The pressure in the shell or drum 55 may be maintained in the neighborhood of from 90 to 125 pounds per square inch, for example, or higher pressures may be used with advantage. Oil may be supplied to the heating conduit 23 under pressure just sufficient to effect the discharge of the hot oil products therefrom into the body of oil 4, or higher pressures may be used and the pressure reduced, for example, at valve 33. The hot oil products discharged from the separate heating conduit into the body of oil 4 assist in heating this body of oil and also assist in maintaining uniform the conditions throughout the body of oil by the agitation provided. The heat supplied to the body of oil by the hot oil products discharged from the separate heating conduit is supplied internally, in a particularly advantageous manner, and to this extent reduces the amount of external heating required or increases the capacity of the apparatus.

I claim:

1. A method of cracking hydrocarbon oils, comprising maintaining a body of oil at a cracking temperature by circulating oil from said body through heating tubes and back to the said body and heating the oil to a cracking temperature in said heating tubes, taking off vapors from said body of oil and subjecting them successively to a first and a second refluxing operation, returning reflux condensate from the first refluxing operation to said body of oil, forcing reflux condensate from the second refluxing operation once through a separate heating conduit and heating it therein to a cracking temperature, and discharging hot oil products from said heating conduit into said body of oil.

2. A method of cracking hydrocarbon oils, comprising maintaining a body of oil at a cracking temperature by circulating oil from said body through heating tubes and back to said body and heating the oil to a cracking temperature in said heating tubes, supplying relatively less refractory oil to said body of oil, taking off vapors from said body of oil and subjecting them successively to a first and a second refluxing operation, returning reflux condensate from the first refluxing operation to said body of oil, forcing reflux condensate from the second refluxing operation together with additional relatively more refractory oil once through a separate heating conduit and heating the mixture therein to a higher cracking temperature, and discharging hot oil products from said heating conduit into said body of oil.

3. A method of cracking hydrocarbon oils, comprising maintaining a body of oil at a cracking temperature by circulating oil from said body through heating tubes and back to said body and heating the oil to a cracking temperature in said heating tubes, taking off vapors from said body of oil and subjecting them successively to a first and second refluxing operation, returning reflux condensate from the first refluxing operation to the oil circulating from said body of oil to said heating tubes, forcing reflux condensate from the second refluxing operation once through a separate heating conduit and heating it therein to a cracking temperature, and discharging hot oil products from said heating conduit into said body of oil.

4. A method of cracking hydrocarbon oils, comprising maintaining a body of oil at a cracking temperature by circulating oil from said body through heating tubes and back to said body and heating the oil to a cracking temperature in said heating tubes, taking off vapors from said body of oil and subjecting them successively to a first and a second refluxing operation, returning reflux condensate from the first refluxing operation to the oil circulating from said body of oil to said heating tubes, forcing reflux condensate from the second refluxing operation together with fresh oil once through a separate heating conduit and heating the mixture therein to a cracking temperature, and discharging hot oil products from said heating conduit into said body of oil.

5. A method of cracking hydrocarbon oils, comprising maintaining a body of oil at a cracking temperature by circulating oil from said body through heating tubes and back to said body and heating the oil to a cracking temperature in said heating tubes, taking off vapors from said body of oil and subjecting them successively to a first and a second refluxing operation, returning reflux condensate from the first refluxing operation to said body of oil, forcing reflux condensate from the second refluxing operation together with relatively more refractory oil once through a separate heating conduit and heating the mixture therein to a higher cracking temperature, discharging hot oil products from said heating conduit into said body of oil, passing relatively less refractory oil in heat exchanging relation with the vapors in at least one of said refluxing operations and supplying said relatively less refractory oil preheated by said heat exchange to said body of oil.

6. A hydrocarbon oil cracking process which comprises subjecting the oil to cracking conditions of temperature and superatmospheric pressure in a heating zone, discharging the heated oil into a vapor separating zone, removing vapors from said vapor separating zone and subjecting the same to primary and secondary dephlegmation thereby forming primary and secondary reflux condensates, combining at least a portion of said primary reflux condensate with the oil being subjected to cracking conditions in said heating zone, passing said secondary reflux condensate to a second heating zone independent of the first mentioned heating zone and there subjecting the same to cracking conditions of temperature and pressure, and then passing said secondary reflux condensate directly to said vapor separating zone without passage through said first mentioned heating zone.

EDWARD W. ISOM.